United States Patent

Cohen

[15] 3,635,385

[45] Jan. 18, 1972

[54] HIGH-SPEED MAGNETIC TAPE

[72] Inventor: William David Cohen, Huntington, N.Y.

[73] Assignee: Systems Resources Corporation, Plainview, N.Y.

[22] Filed: Jan. 15, 1970

[21] Appl. No.: 3,071

[52] U.S. Cl. ..........226/97

[51] Int. Cl. ..........B65h 17/32

[58] Field of Search ..........226/95, 97, 7; 274/4, 11

[56] References Cited

UNITED STATES PATENTS

| | | | |
|---|---|---|---|
| 3,110,431 | 11/1963 | Potter et al. | 226/97 X |
| 3,281,039 | 10/1966 | Foley | 226/95 |
| 3,297,221 | 1/1967 | Licht et al. | 226/195 X |
| 3,518,649 | 6/1970 | Gabor | 226/95 X |

*Primary Examiner*—Allen N. Knowles
*Assistant Examiner*—Gene A. Church
*Attorney*—Posnack, Roberts and Cohen

[57] ABSTRACT

An endless loop of magnetic tape is supported on two bearings and a driving capstan positioned in triangular relationship. The bearings and the capstan are mounted on a panel which is spaced a parallel cover. The cover and panel confine the space within the loop of tape to define a chamber to which an evacuating force is applied to draw the tape toward the bearings and capstan. The outside of the tape is exposed to ambient atmosphere so that movement of the tape past a magnetic head to which the tape is exposed creates a laminar airflow avoiding direct contact between the head and tape. Inside of the loop the bearings are fixed but are, however, provided with a flow of air providing for a cushion between the bearings and the tape. The output of the head can be monitored and used to control the aforenoted evacuating force to control the passage of the tape across the head.

9 Claims, 4 Drawing Figures

INVENTOR.
WILLIAM D. COHEN
BY
Posnack, Roberts & Cohen
ATTORNEYS

INVENTOR.
WILLIAM D. COHEN

BY
Posnack, Roberts & Cohen
ATTORNEYS

HIGH-SPEED MAGNETIC TAPE

BACKGROUND OF INVENTION

1. Field of the Invention

This invention relates to magnetic tape devices and more particularly to arrangements for supporting and using magnetic tapes to facilitate the use of the same in high-speed operations.

2. Description of Prior Art

T. P. Foley, in U.S. Pat. No. 3,281,039, discloses the use of a vacuum force to bring a tape into contact with a capstan while at the same time possibly bringing tape into improved positional relationship with pressure bearings. This patent suggests the application of a vacuum to a relatively small portion of the associated tape and consequently subjects the tape to possibilities of damage and premature deterioration. Moreover, this patent fails to reveal suitable means for preventing transverse displacement of the tape and therefore does not provide for accurate reading and recording operations with respect thereto.

H. K. Baumeister et al., in U.S. Pat. No. 3,170,045, likewise illustrate the use of a vacuum tensioning arrangement, but also suggest the application of the tensioning force to a relatively small portion of the tape, thereby also exposing the tape to the problems enumerated hereinabove with respect to the Foley construction.

W. Lehnert, in U.S. Pat. No. 3,359,547, also employs a vacuum for the purpose of tensioning tapes. As discussed with respect to the previously mentioned patents, the vacuum employed by W. Lehnert is applied to a relatively small portion of the associated tape, therefore also exposing the same to a highly localized force and resulting premature wear and damage.

A vacuum is, moreover, used by W. H. Pouliart et al. in U.S. Pat. No. 2,962,200. This patent does not reveal the use of a closed loop of tape nor is an evacuating force employed in the same sense as in the present invention. Moreover, due to the use of accordionlike folds in the tape, the arrangement of this patent is not suitable for high-speed use.

The aforementioned patents, with the exception of the Foley patent, do not use closed loops and are therefore distinguishable from the instant invention. Another patent showing the use of a closed loop is the J. T. Potter et al. U.S. Pat. No. 3,110,431. This patent discloses the use of a vacuum for tape-tensioning purposes. However, this vacuum is applied externally of the associated loop and the evacuating force is applied locally which, as noted above, leads to premature deterioration.

Pressurized guides are disclosed in U.S. Pat. Nos. 2,612,566, 2,908,495 and 3,219,990, as well as in U.S. Pat. No. 3,416,148. None of these guides is employed in association with a vacuum tensioning device in the same sense as the invention to provide a high-speed magnetic tape loop device, as will be discussed hereinafter.

Finally, in *IBM Technical Disclosure Bulletin*, Vol. 10, No. 2, July, 1967, there is disclosed a magnetic tape device in which a vacuum is used to transfer the drive of a tape between two capstan elements. Not only is the vacuum applied externally of the loop, but moreover it is applied to a relatively limited portion thereof.

SUMMARY OF INVENTION

It is an object of the invention to provide an improved magnetic tape loop device which avoids the disadvantages of the prior art noted hereinabove.

It is another object of the invention to provide an improved magnetic tape device capable of operation at high speeds and particularly useful, for example, in data terminals and data handling devices such as the Intrex library system and the like.

Yet another object of the invention is to provide an improved magnetic tape device capable of high-speed operation with a high-life expectancy due to the use of low-friction components and a minimum of moving parts.

Still another object of the invention is to provide an improved device of the above-noted type having additional features which render unnecessary the use of edge guides in the vicinity of the capstan to maintain tracking precision.

As a feature of the invention, it will be noted that frictional rubbing between the capstan and tape is almost completely avoided due to the equivalence of the surface speeds of the two. As a further feature of the invention, it is to be noted that the guides or bearings employed are pressurized and ported so that the tape rides on a layer or cushion of air.

As still another feature of the invention it will be noted that the oxide side of the magnetic tape employed moves across an associated magnetic reading and recording head such that the relative motion of the tape to the head produces an extremely thin laminar flow of air therebetween to eliminate frictional wear.

To achieve the above and other of the objects and features of the invention, there is provided an apparatus comprising an endless loop of tape with first means to support the tape from the inside of the loop and with second means to form with the loop a substantially enclosed chamber located within the loop, there being moreover provided a third means to apply the evacuating means to the chamber whereby the loop of tape is drawn against the first means. The chamber to which the evacuating force is applied therefore is bounded by substantially the entire tape along which the evacuating force is substantially equally distributed.

The first means includes a drive capstan which engages and drives the tape, but which moves with a peripheral surface speed equal to the speed of the tape and therefore substantially avoids frictional rubbing against the same. Said first means also includes at least one bearing which is spaced from the capstan and engages the tape to support the loop in elongated configuration.

Preferably two bearings are employed which, together with the capstan, are supported at the apices of a triangle. Each such bearing is preferably a hollow cylinder provided with radially disposed openings through which air is vented to provide a cushion on which the tape rides.

The second means noted above preferably includes a panel which supports the capstan and bearings. It further includes a cover spaced from, but parallel to, said panel, the tape being located between and being perpendicular to the parallel surfaces of the cover and panel.

In a preferred embodiment of the invention, the panel is provided with a row of openings within the loop and communicating with the above-noted chamber. These openings constitute the access to the chamber through which an evacuating force is applied. The cover is spaced from the panel by an amount slightly exceeding the width of the tape to allow a limited influx of ambient air by means of which excessive forces on the tape are avoided.

The above-noted capstan is provided with a crown-shaped profile. At high speeds this has the effect of creating opposite displacement forces operating towards the axial center of the capstan which in turn serves as a self-centering device for the tape which accordingly does not require the use of edge guides in the vicinity of the capstan.

The bearings, on the other hand, may in accordance with a preferred embodiment of the invention be provided with ceramic sidepieces which provide lateral guide flanges to prevent lateral displacement of the tape.

The magnetic head employed in accordance with the invention is preferably positioned to intrude partially between the above-noted bearings so that the tape follows a serpentine path sequentially past one of the bearings, then past the head and then past the other of the bearings.

According to a further feature of the invention, there may be provided a means to measure and evaluate the output of the magnetic head for the control of a further means which in turn controls the evacuating force. This enables the proximity of the tape to the head to be adjusted automatically.

Other objects, features and advantages of the invention will be apparent from the detailed description of a preferred embodiment which follows hereinafter.

DETAILED DESCRIPTION

Figure 1:
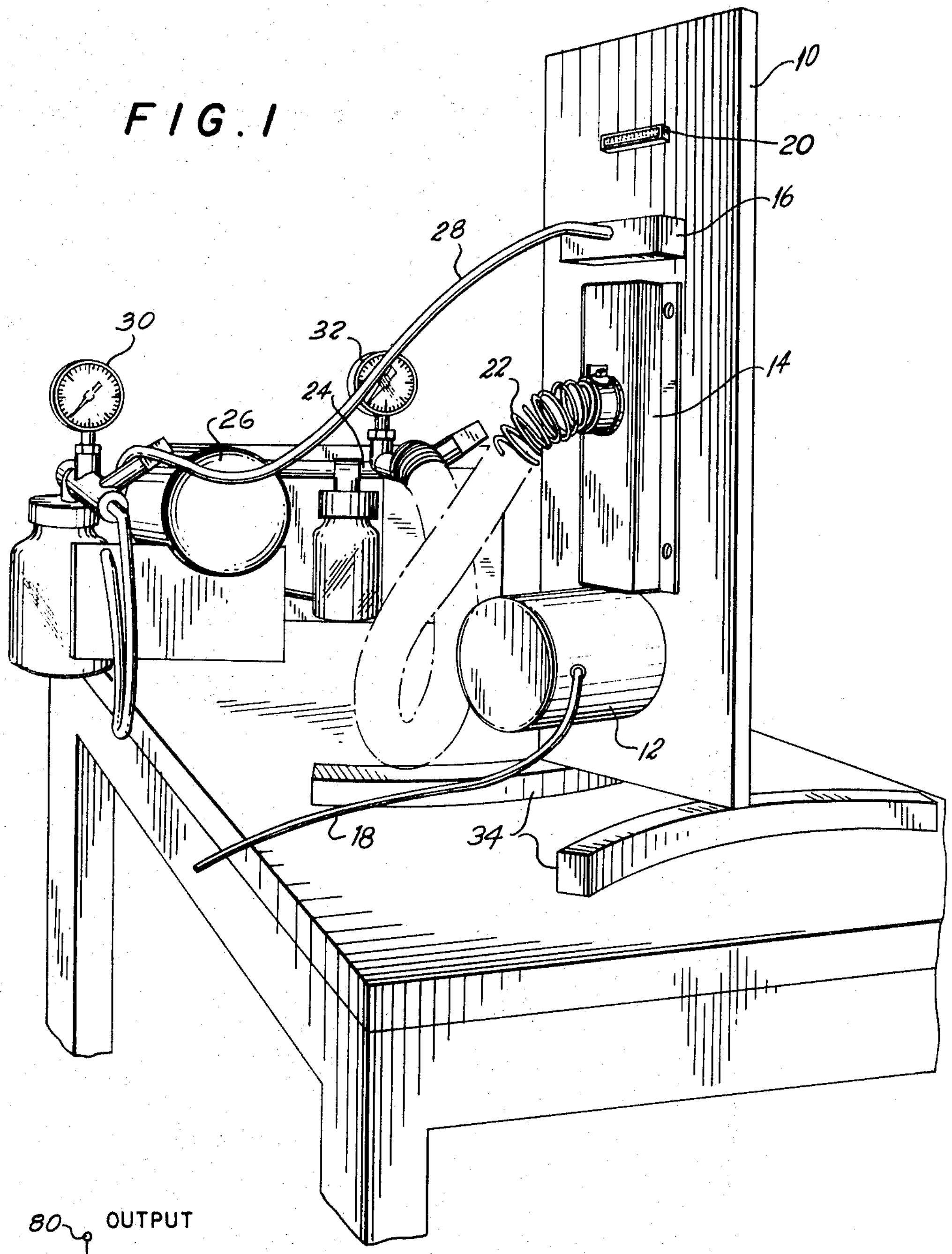
FIG. 1 is a rear, perspective view of the apparatus of the invention illustrative of the panel on which the magnetic tape is mounted and of the sources of the evacuating force and air cushion.

In FIG. 1 is illustrated a panel 10 on which is mounted a motor 12, a first box 14 and a second box 16. The motor 12 is supplied power through a plurality of lines 18.

As will be seen, the motor 12 drives the capstan which in turn drives the loop of tape. The box 14 is effectively a manifold through which communication is made to the chamber defined within the loop of tape. The box 16 is effectively a manifold through which air is supplied under pressure to the bearings on which the loop is supported in addition to the capstan 12.

Also appearing in FIG. 1 is a terminal block 20 by means of which electrical connection is made with the magnetic head employed in accordance with the invention.

A flexible conduit 22 is connected to the box 14 and at its other end is connected with a vacuum pump 24. A motor 26 provides a source of pressurized air which is led via conduit 28 to box 16. The vacuum pressure and the air pressure can be read on gauges 32 and 30 respectively.

Panel 10 is illustrated as being mounted on a stand 34. It will be readily appreciated that various other types of supports are possible and that the panel 10 may equally as well be incorporated into an associated data processing apparatus for which the magnetic tape is intended to constitute a storage.

Figure 2:
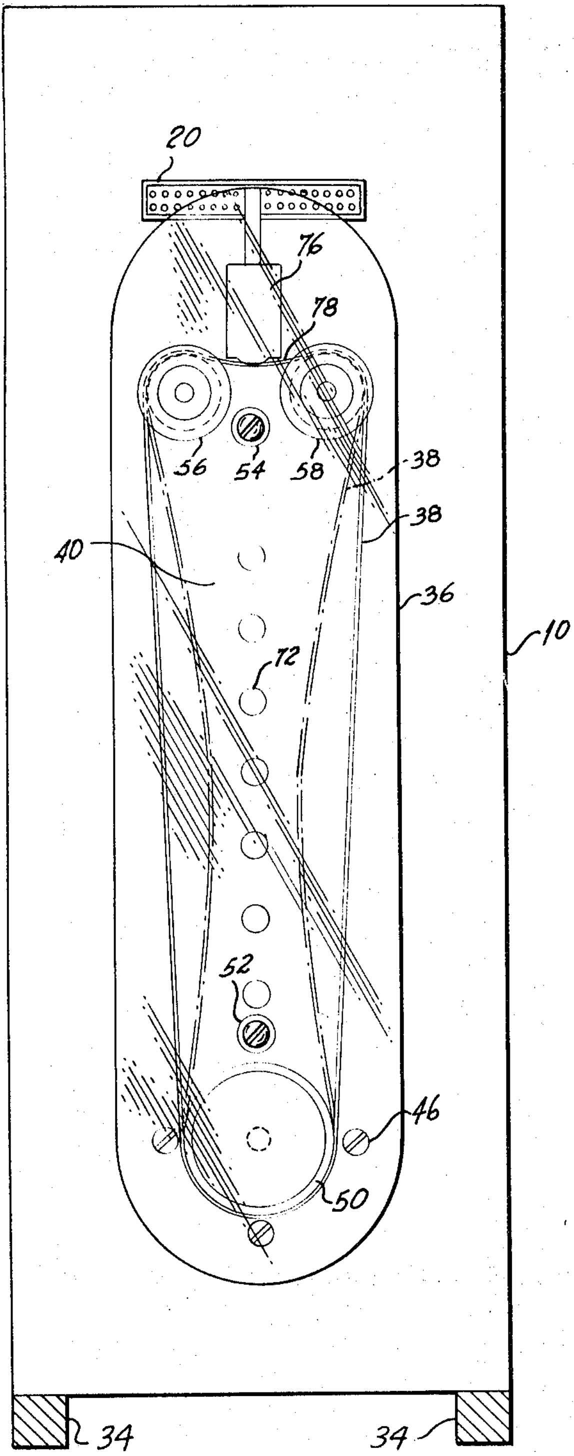
FIG. 2 is a front view of the panel on enlarged scale illustrating the tape loop and the support and drive therefor.
Figure 3:
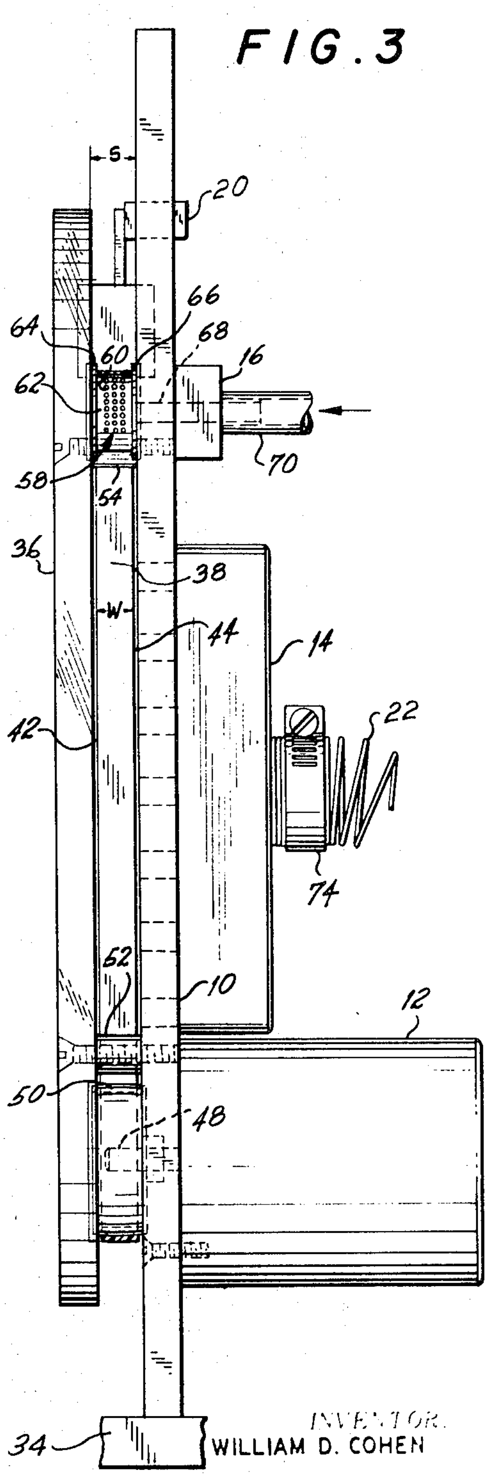
FIG. 3 is a side view of the apparatus of FIG. 2.

The panel 10 is also illustrated in FIGS. 2 and 3, in which also appears the cover or plate 36. Whereas panel 10 is preferably of metal, the cover 36 is preferably of plastic and is preferably transparent to permit supervising and monitoring the operations which will be discussed hereinafter. Cover 36 is spaced from panel 10 by a distance S which is slightly greater than the width W of magnetic tape 38 which is formed into an endless loop to define an inner space 40 confined at opposite edges of the tape 38 by cover 36 and panel 10 to form a substantially closed chamber to which an evacuating force can be applied. Actually, there are small clearances 42 and 44 through which ambient air can pass in order to avoid applying excessive forces to the tape.

The tape 38 can be a conventional magnetic tape having a base side on the interior of the loop and an oxide or magnetizable side on the opposite side of the loop.

Motor 12 is fastened to the panel 10 by screws 46. The motor includes a shaft 48 which supports capstan 50 and imparts a rotational driving force thereto. The lower end of the loop into which tape 38 is formed is supported on the capstan 50.

The capstan is provided with a crown-shaped profile or, in other words, has a convex peripheral surface. When the tape is driven at high speeds, this shape tends to impart displacement forces to the tape driving both edges thereof towards the axial center or high point of the outer surface. The two forces created are opposing, but serve to self-center the tape so that the tape will not be laterally or transversely displaced on the capstan.

Cover 36 is supported on panel 10 by studs 52 and 54. These studs are so arranged and shaped as to provide the necessary spacing between the cover and panel.

Towards the top of the panel are located bearings 56 and 58. These bearings and the capstan 50 are arranged at the apices of an isoceles triangle.

Each of the bearings is provided with a plurality of peripheral openings 60 which are formed in a hollow cylinder 62 which constitutes the major portion of the structure. The openings 60 are arranged over an approximately 90° portion of the cylinder 62 and are the openings through which air is passed to provide an air cushion on the surface of cylinder 62.

Each of the bearings, moreover, comprises two ceramic edge guides 64 and 66, these being formed of a highly polished aluminum oxide and providing lateral flanges which prevent displacement of the tape which is riding on an air cushion on the associated cylinder 62. Members 64 and 66 are preferably formed of a ceramic since the rapidly moving edge of the tape 38 will constitute a knife edge which might readily pass through other substances having less abrasion resistance.

Box 16 is connected to the interior of the cylinders of the bearings via bores 68. Box 16 is provided with a nipple 70 to which the conduit 28 is connected. Box 14 is connected with the chamber inside of the loop of tape 38 by means of a plurality of bores 72 and is furthermore provided with a coupling 74 to which the conduit 22 is connected. The bores or openings 72 are arranged in a rectilinear row in which they are evenly spaced to distribute the evacuating force evenly through the aforenoted chamber.

The aforenoted terminal block 20 (FIG. 1) is connected to magnetic head 76 which may be of conventional design. The head 76 protrudes partially between bearings 56 and 58 so that the tape portion at 78 follows a serpentine path sequentially past one of the bearings, then past the magnetic head and then past the other of the bearings.

The minimum path that the tape can follow around the bearings and capstan is indicated by the tape 38 as shown in solid lines. The actual length of the tape, however, exceeds this length so that when a vacuum is applied via openings 72, the tape bellies inward as shown by the tape as illustrated by dotted lines.

In operation, the tape is engaged and driven by the capstan 50, in turn driven by motor 12. Since the peripheral speed of the capstan 50 and the speed of the tape 38 is substantially equal, there is little frictional rubbing force between the two and little or no consequential deterioration of the tape. Although bearings 56 and 58 are fixed, the air cushion provided on the periphery of the same avoids actual contact between the tape 38 and these bearings so that no friction results by virtue of contact therebetween.

Although the inside of the tape has an evacuating force applied thereto, the outside of the tape, or the oxide side, is exposed to ambient atmosphere. Since the tape may be driven at relatively high speeds, a very thin layer of air is drawn along with the tape at the portion 78 and acts as a lubricant between the tape and the head 76, this air constituting a laminar flow between the head and tape. As a result, deterioration of the tape due to the engagement with head 76 is substantially avoided.

Figure 4:
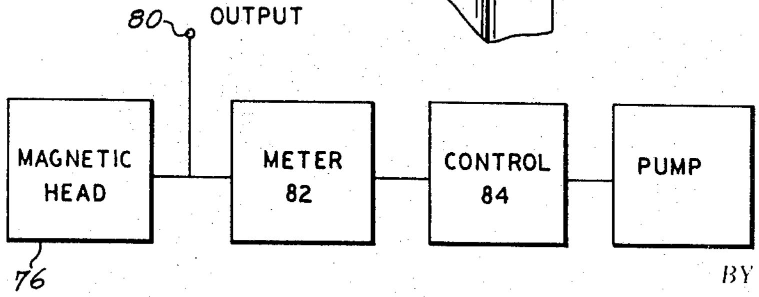
FIG. 4 is a block diagram of the automatic control employed with the apparatus of FIGS. 1–2.

Adjustment of the tension applied to the tape as a result of the evacuating force can be controlled manually by adjustment of the associated pump. This adjustment can also be automatic as illustrated in FIG. 4, wherein the magnetic head 76 appears diagrammatically. The output of this magnetic head is indicated generally in the form of terminal 80.

As appears in FIG. 4, a meter 82 is coupled to the magnetic head to measure and evaluate the output of the same. Conventional variations are ignored and the meter 82 indicates merely changes in level. The output of meter 82 is fed to a control 84 which is an analog device controlling the pump which creates the evacuating force.

From what has been stated above, it will now be understood that the invention proposes an arrangement and apparatus wherein an evacuating force is applied to a chamber located within an endless loop of tape bounded on opposite sides by the confining surfaces of a panel and cover.

What is claimed is:

1. Apparatus comprising an endless loop of magnetic tape, first means to support said tape from the inside of said loop, second means to form with said loop a substantially enclosed chamber located within said loop, third means to apply an evacuating force to said chamber whereby said loop of tape is drawn against said first means, and a magnetic head to scan said tape, said first means including a drive capstan for engaging and driving said tape and bearings spaced from said capstan and engaging the tape to support the loop in elongated configuration, said second means including a panel supporting said first means and a cover spaced from said panel, said cover and panel having facing parallel surfaces, said tape being located between and perpendicular to said surfaces, said panel being provided with at least one opening located within said loop and through which said third means applies said evacuating force, said bearings being arranged in triangular relationship with said capstan, each of said bearings being an air bearing comprising a hollow cylinder provided with radially disposed openings, said apparatus further comprising a source of air coupled to said cylinder and venting through said openings to provide a cushion of air on which the tape rides.

2. Apparatus as claimed in claim 1, wherein the openings in each bearing are disposed over an approximately 90° portion thereof.

3. Apparatus as claimed in claim 1, wherein each said bearing includes ceramic sidepieces providing lateral guide flanges on the associated cylinder.

4. Apparatus as claimed in claim 1, wherein the capstan is of crown-shaped profile to provide self-centering for the tape.

5. Apparatus as claimed in claim 1, comprising a motor mounted on the panel to drive said capstan, and a box on the panel to enclose said opening, said third means being coupled to said box.

6. Apparatus as claimed in claim 1, wherein said cover is transparent.

7. Apparatus as claimed in claim 1, wherein said magnetic head intrudes partially between said bearings so that the tape follows a serpentine path sequentially past one of said bearings, said head and the other of said bearings.

8. Apparatus comprising an endless loop of magnetic tape, first means to support said tape from the inside of said loop, second means to form with said loop a substantially enclosed chamber located within said loop, third means to apply an evacuating force to said chamber whereby said loop of tape is drawn against said first means, and a magnetic head to scan said tape, said apparatus further comprising means to measure the output of said head and means responsive to said output to control said third means.

9. Apparatus as claimed in claim 1, wherein said bearings are fixed and the tape has base and oxide sides of which the base side faces the bearings and capstan.

* * * * *